May 2, 1961 C. C. BAUERLEIN 2,982,304
PNEUMATIC CONTROL VALVE
Filed May 7, 1958

Inventor
Carl C. Bauerlein

United States Patent Office 2,982,304
Patented May 2, 1961

2,982,304

PNEUMATIC CONTROL VALVE

Carl C. Bauerlein, Lincolnwood, Ill., assignor to The Dole Valve Company, Morton Grove, Ill., a corporation of Illinois Filed May 7, 1958, Ser. No. 733,648

6 Claims. (Cl. 137—612.1)

This invention relates to a control valve and more particularly to a valve adapted to alternately control the flow of fluid from a single inlet to one of two outlets.

In the past, valves of the type above described have been used for various purposes such as for controlling the flow of water in an automatic washing machine. When so utilized the inlet to the valve body is generally connected with the outlet from the washing machine tub and is operable either to divert water through one outlet to a drain or to divert water through the other outlet to a reserve tub to be utilized again in the washing machine.

Heretofore, such valves have generally been solenoid controlled and, accordingly, relatively expensive to manufacture and repair. Applicant, however, has devised a control valve which may be pneumatically operated and which may be very cheaply produced to be used preferably, but not by way of limitation, in a mechanism such as a washing machine having a pneumatic system for controlling a multiplicity of other components therein.

In applicant's device, fluid normally flows through the valve inlet to a fluid chamber and out through a first outlet. Upon energization of a pneumatic pump or the like, air pressure is then directed to the valve to close the first outlet and sequentially open the second outlet to divert the flow of fluid from the first outlet to the second outlet.

Accordingly, it is a principal object of this invention to provide a control valve for pneumatically controlling the flow of fluid to separate outlets.

It is another object of this invention to provide a control valve of the type above described which may be economically manufactured and readily assembled.

It is a still further object of this invention to provide a control valve of the type above described wherein the valve means for controlling the flow of fluid through one of the outlets is normally held in the open position by fluid pressure and wherein the valve means for controlling the flow of fluid through the other of the outlets is normally biased into a closed position with respect to the second outlet and wherein pneumatic means are operable to close the first valve means and open the second valve means to divert the flow of fluid from the first outlet to the second outlet.

Figure 1:
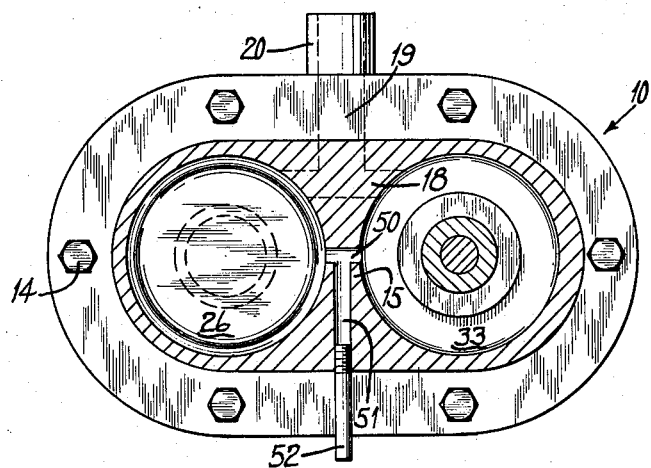
Figure 2:
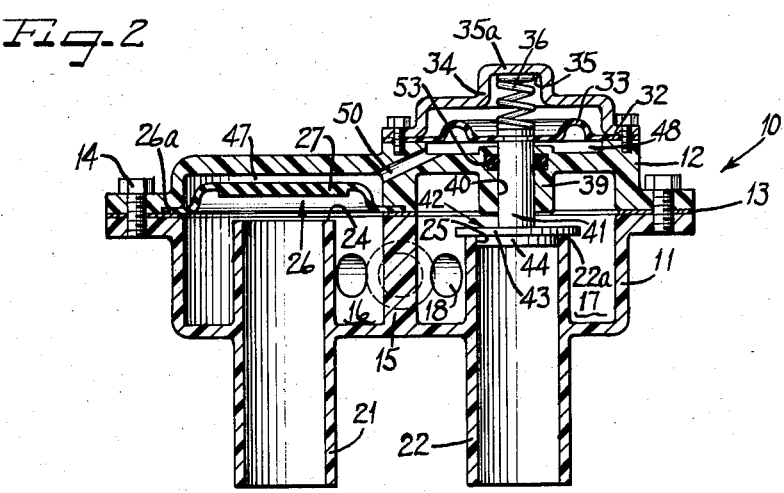

These and other objects of the invention will become apparent from time to time as the following specification proceeds and with reference to the accompanying drawings, wherein:

Figure 1 is a plan view of a device constructed in accordance with the present invention; and Figure 2 is a vertical sectional view through a valve structure constructed in accordance with the present invention.

In the embodiment of the invention illustrated in the drawings, there is shown a two-part valve body 10 comprising a cup member 11 and a cap 12 which have a sealing gasket 13 lying therebetween and which are connected together by means of screws 14.

A central wall 15 formed integrally with the cup member 11 and extending upwardly from the base thereof divides the hollow valve body 10 into two separate fluid outlet chambers 16 and 17. A transverse passage 18 through the upstanding wall 15 serves to intercommunicate the fluid chambers 16 and 17 and is intersected by and opens to an inlet passage 19 which extends through the tubular connecting boss 20.

A pair of tubular outlet fittings 21 and 22 extend through and are formed integrally with the bottom wall of the cup member 11 and open into the fluid outlet chambers 16 and 17 through respective ports 24 and 25.

A flexible annular diaphragm 26 is peripherally seated on the gasket 13 and is arranged to overlie the fluid outlet chamber 16 and is maintained in position with respect thereto by abutment with the cap 12 which is recessed as at 26a to receive the peripheral portion of the diaphragm 26. The flexible annular diaphragm 26 has a thickened portion 27 centrally formed therewith which is cooperable with the port 24 to control fluid flow from the outlet chamber 16 to the outlet 21.

An annular raised lip 32 on the outer surface of the cap 12 is coaxially aligned with the outlet fitting 22 and is arranged to provide a seat for a flexible annular diaphragm 33. An inverted cup member 34 having a central recess 35 therein is cooperable with the raised lip 32 to seal the flexible annular diaphragm 33 to the raised lip 32. A spring member 36 is positioned within the hollow recess 35 and abuts the end wall 35a thereof and is arranged to abut the flexible annular diaphragm 33 for reasons which will hereinafter become apparent.

A depending boss 39 formed integrally with the cap 12 is coaxially aligned with the outlet fitting 22 and is apertured as at 40 to slidably receive a connecting link 41 which serves to interconnect the flexible annular diaphragm 33 with a two-part valve member 42.

The valve member 42 has a radially enlarged portion 43 which is arranged to abut the end of the tubular outlet fitting 22 and which is connected with a radially reduced valve portion 44 which is arranged to snugly engage the inner wall of the tubular outlet fitting 22 to control the flow of fluid through the port 25. Thus, when the flexible annular diaphragm 33 moves upwardly with respect to the cap 12, the valve member 42 will become unseated from the annular seat 22a defining the annular port 25 and fluid will flow from the outlet chamber 17 through the outlet fitting 22.

Valve closing movement of the valve members 26 and 33 is accomplished in the following manner: An air chamber 47 is formed between the inner surface of the cap member 12 and the upper lateral surface of the flexible annular diaphragm 26 and another air chamber 48 is formed between the flexible annular diaphragm 33 and the upper lateral surface of the cap 12. A bore 50 in the cap 12 serves to intercommunicate the air chambers 47 and 48 and is intersected by and opens to an air passage 51 which terminates in a nipple 52.

Fluid pressure communicated to the outlet chamber 16 from the inlet 20 will normally be operable to maintain the flexible annular diaphragm valve 26 in the position illustrated in Figure 2 to maintain open communication between the inlet 20 and the outlet 21. Furthermore, there will normally be no fluid flow through the outlet fitting 22 since the valve member 42 will be biased into engagement with the annular seat 22a by spring member 36 which abuts the upper end portion of the connecting link 41 interconnecting the diaphragm 33 and the valve member 42. It will, however, be obvious that pressurized air may be directed to the air chambers 47 and 48 by connecting an air pressure hose to the nipple 52 and that when air pressure is directed to the foregoing chambers, the diaphragm valve 26 will be moved downwardly until it seats against the annular port 24 defining the tubular outlet 21 and that the pressure of the air within the air chamber 48 acting upwardly on the flexible annular diaphragm 33 will be operable to overcome the resistive force of the spring member 36 and move the diaphragm 33, connecting link 41, and valve member 42 upwardly with respect to the port 25 to first close communication between the inlet 20 and the outlet fitting 21 and then open communication between the inlet and the outlet fitting 22.

Obviously, upon release of the air pressure within the air chambers 47 and 48, the biasing spring 36 will move the diaphragm 33, connecting link 41, and valve member 42 to substantially the position illustrated in Figure 2 to close communication between the inlet 20 and the outlet fitting 22 and fluid pressure acting on the underside of the diaphragm member 26 within the fluid outlet chamber 16 will act to move the diaphragm 26 upwardly from the port 24 to open communication between the inlet 20 and the outlet fitting 21.

An O ring 53 is preferably disposed in the cap 12 around connecting link 41.

Accordingly, applicant has provided a simple, inexpensive, positively operating control valve which is relatively easily assembled and pneumatically operated.

From the above description, it will be seen that applicant has provided a novel two-way valve in which pneumatic pressure applied to a pair of diaphragms causes the closing of one outlet passage and the opening of a second outlet passage and reversely the removal of the pneumatic pressure causes the closing of the second outlet passage by resilient biasing means and the opening of the first outlet passage by the fluid pressure of the system. The valve, so described, embodying the present invention provides an extremely effective means for controlling the flow of fluid from a supply conduit to one or the other of two delivery conduits.

It will be observed that due to the inherent time delay produced by spring 36 (since its preloading must first be overcome before the valve 42 starts to open), the valve 26 closes before the valve 42 opens. When, however, pneumatic pressure is relieved from the air chambers 47 and 48 the valve 42 closes before the valve 26 opens since the spring force biasing the valve 42 into a closed position is greater than the fluid pressure force tending to open the valve 26. This mode of operation is obviously advantageous since at no time during the operation of the control valve is the inlet communicable with more than one outlet.

It will herein be understood that this embodiment of the invention has been used for illustrative purposes only and that various modifications and variations of the present invention may be effected without departing from the spirit and scope of the novel concepts thereof.

I claim as my invention:

1. A pneumatic control valve including a valve body, a partitioning wall within said valve body dividing the interior thereof into two fluid chambers, outlets from each of the fluid chambers, a common inlet to each of the fluid chambers, a diaphragm valve within one of the fluid chambers and sealed to the walls thereof cooperable with the outlet therefrom to control fluid flow therethrough, a poppet valve cooperable with the other of said outlets to control fluid flow therethrough, fluid pressure means biasing said diaphragm valve into an open position with respect to its adjacent outlet, spring means biasing said poppet valve into a closed position with respect to its adjacent outlet, and pneumatic means applying fluid pressure selectively on said diaphragm valve and said poppet valve for closing said diaphragm valve and for opening said poppet valve.

2. A two-way valve comprising a valve body, a fluid supply passage leading into said body, a first and a second outlet passage communicating with said supply passage and leading from said valve body, valves movable to close communication from said supply passage to said outlet passages, respectively, one of said valves being biased to an open position by fluid pressure in said supply passage, the other of said valves being spring biased to a closed position, and pneumatic means applying fluid pressure selectively on said first valve and said second valve for closing said first valve and opening said second valve.

3. A two-way valve comprising a valve body, a fluid supply passage leading into said body, a first and a second outlet passage communicating with said supply passage and leading from said valve body, valve means each including a flexible diaphragm movable to close said outlet passages respectively, one of said valve means being biased to an open position by fluid pressure in said supply passage, the other of said valve means being spring biased to a closed position, and pneumatic means applying fluid pressure selectively on said first valve means and said second valve means for closing said first valve means and opening said second valve means.

4. A two-way valve comprising a valve body, a fluid supply passage leading into said body, a first and a second outlet passage communicating with said supply passage and leading from said valve body, a diaphragm valve movable to close said first outlet passage, a second diaphragm, a valve carried by said second diaphragm movable upon movement of said second diaphragm to close said second outlet passage, and pneumatic means simultaneously applying fluid pressure against said diaphragms for opening one of said valves and closing the other of said valves.

5. A two-way valve comprising a valve housing having a pair of fluid outlet pipes extending into said housing and forming a pair of valve seats, a fluid inlet opening into the region of said housing around said outlet pipes, a diaphragm extending across a portion of said housing above one of said valve seats and providing a separate pneumatic chamber on the opposite side thereof, said diaphragm being positioned to cover and uncover said one valve seat, a second valve reciprocably mounted above said other valve seat and movable to cover and uncover said second valve seat, said housing having another chamber above said second valve and separated by a wall therefrom, a valve carrying link slidably extending through said wall, a flexible diaphragm extending across said other chamber over said link and providing a pneumatic chamber on the opposite side thereof from which said link is disposed, spring means within said second mentioned pneumatic chamber urging said second diaphragm and said second valve against its associated valve seat and means for introducing a fluid under pressure to said first and said second pneumatic chambers.

6. A pneumatic control valve including a hollow valve body, an inlet to and a pair of outlets from said hollow valve body, valve means associated with each of said outlets to control fluid flow therethrough, fluid pressure means biasing one of said valve means to an open position with respect to its respective outlet, means biasing the other of said valve means into a closed position with respect to its respective outlet, and pneumatic means applying fluid pressure against said first and second mentioned valve means for closing said first mentioned valve means and for opening said second mentioned valve means against the biasing force of said fluid pressure means and said second mentioned means respectively.

References Cited in the file of this patent

UNITED STATES PATENTS

| | | |
|---|---|---|
| 766,420 | Calley | Aug. 2, 1904 |
| 2,376,918 | Hughes | May 29, 1945 |
| 2,414,196 | Geldhof | Jan. 14, 1947 |
| 2,562,631 | Morrison | July 31, 1951 |
| 2,677,390 | Davis | May 4, 1954 |
| 2,720,150 | Lyman | Oct. 11, 1955 |
| 2,743,900 | Holzer | May 1, 1956 |

FOREIGN PATENTS

| | | |
|---|---|---|
| 636,194 | France | Jan. 7, 1928 |
| 766,865 | Great Britain | Jan. 23, 1957 |